United States Patent [19]

Matsumoto et al.

[11] Patent Number: 5,210,624
[45] Date of Patent: May 11, 1993

[54] HEADS-UP DISPLAY

[75] Inventors: Tsuyoshi Matsumoto, Atsugi; Reiko Watanabe, Kani; Shin Eguchi; Hirokazu Aritake, both of Isehara; Takashi Morihara, Kawasaki; Fumio Yamagishi, Ebina, all of Japan

[73] Assignee: Fujitsu Limited, Kawasaki, Japan

[21] Appl. No.: 770,157

[22] Filed: Oct. 3, 1991

Related U.S. Application Data

[63] Continuation of Ser. No. 584,619, Sep. 19, 1990, abandoned.

[30] Foreign Application Priority Data

Sep. 19, 1989 [JP] Japan .................. 1-240706
Dec. 8, 1989 [JP] Japan .................. 1-319702

[51] Int. Cl.$^5$ .................. G02B 5/32; G02B 27/10
[52] U.S. Cl. .................. 359/13; 359/14; 359/24; 359/630
[58] Field of Search .................. 350/3.7, 3.77, 172, 350/174, 339 F, 404; 359/13, 14, 630, 633, 634, 15, 24

[56] References Cited

U.S. PATENT DOCUMENTS

| | | | |
|---|---|---|---|
| 3,719,127 | 3/1973 | Mueller | 350/162.12 |
| 3,915,548 | 10/1975 | Opittek et al. | |
| 4,080,046 | 3/1978 | Nishizaki | 350/404 |
| 4,407,564 | 10/1983 | Ellis | 350/3.7 |
| 4,447,128 | 5/1984 | Ferrer | 350/3.7 |
| 4,582,394 | 5/1986 | Boyd | 350/3.7 |
| 4,655,540 | 4/1987 | Wood et al. | 350/3.7 |
| 4,930,847 | 6/1990 | Cederquist | 350/3.7 |
| 4,964,702 | 10/1990 | Sugimoto et al. | 350/339 F |

FOREIGN PATENT DOCUMENTS

| | | |
|---|---|---|
| 0157958 | 10/1985 | European Pat. Off. . |
| 0200022 | 11/1986 | European Pat. Off. .......... 350/3.7 |
| 1115657 | 10/1961 | Fed. Rep. of Germany . |
| 62-149435 | 9/1987 | Japan . |
| 63-194201 | 8/1988 | Japan ................. 350/3.7 |
| 1-44913 | 2/1989 | Japan . |
| 1-86110 | 3/1989 | Japan ................. 350/3.7 |
| 1-54018 | 4/1989 | Japan . |
| 1-100511 | 4/1989 | Japan ................. 350/3.7 |
| 2123657 | 2/1984 | United Kingdom . |

OTHER PUBLICATIONS

Wyszecki et al., Color Science: Concepts and Methods, Quantitative Data and Formulae, 2nd Edition, John Wiley and Sons, 1982, pp. 176 to 179, 723 and 724.

Hardy, A. C., Colorimetry, Handbook of, Massachusetts Institute of Technology, 1936, pp. 1 to 86.

W. D. Wright, The Measurement of Color, Fourth Edition, Textile Book Service, Metuchen, N.J., 1969, pp. 189, 190, and 212 to 216.

Berry, R. L. et al., "The Lintern Wide Field-of-View Raster Head-up Display," Proceedings of the IEEE 1981 National Aerospace and Electronics Conference, Dayton, May 19-21, 1981, vol. 3, pp. 1261-1268.

Primary Examiner—Martin Lerner
Attorney, Agent, or Firm—Staas & Halsey

[57] ABSTRACT

A heads-up display including a holographic optical element which reflects only at least one specific wavelength and allows a background light of other wavelengths to pass therethrough, an information source which emits information light having the specific wavelength, and a device for removing a wavelength of light corresponding to a complementary color of the specific wavelength.

19 Claims, 10 Drawing Sheets

HEADS-UP DISPLAY

This application is a continuation of application Ser. No. 07/584,619, filed Sep. 19, 1990, now abandoned.

BACKGROUND OF THE INVENTION

1. Field of the Invention

The present invention relates to a heads-up display through which information light (image) superimposed on background light (image) of an outside scene can be viewed.

2. Description of the Related Art

It is known to use a heads-up display in an aircraft or other vehicle to observe various information, such as speed, position, the quantity of remaining fuel, etc., of the aircraft or vehicle, against the background of the outside scene. An operator (viewer) can view information (image) while viewing the background scene on which the information image is superimposed in the heads-up display (which will be referred to as HUD hereinafter) at the same time, substantially without moving the eyes.

Two types of heads-up displays are known: one using a semitransmission plate and the other a holographic optical element. The former type has less visibility due to a low contrast between the background image and the information image superimposed on the background image, and a lesser brightness thereof. Accordingly, where a high visibility is required, a HUD using the holographic optical element is widely and advantageously employed. The subject of the present invention is directed to such a holographic HUD.

In general, a holographic optical element used in the holographic HUD has wavelength characteristics in which the holographic optical element reflects only light of a specific wavelength (wavelength band) and allows light of other wavelengths to pass therethrough. The information light has the selected specific wavelength, and thus the viewer (driver or operator) can observe both the information light reflected by the holographic optical element and the background light transmitted therethrough. Consequently, the background image which can be viewed through the holographic HUD does not include a color corresponding to the specific wavelength. Namely, the background light which can be viewed through the holographic HUD tends to be colored by a complementary color of the specific wavelength, which gives the background image an unnatural appearance. This may cause the viewer to misjudge the color, and accordingly, the necessary information.

The primary object of the present invention is to eliminate the above-mentioned drawback of a holographic HUD, i.e., that the background is unnaturally colored with a complementary color of a specific wavelength reflected by a holographic optical element.

SUMMARY OF THE INVENTION

To achieve the object mentioned above, according to the present invention, there is provided a heads-up display that reflects only specific (at least one) wavelengths and allows a part of the background light to pass therethrough. Information light is emitted that has the specific wavelength. The wavelength of light corresponding to a complementary color of the specific wavelengths is intercepted.

According to an aspect of the present invention, there is provided a heads-up display with a holographic optical element which reflects only a specific wavelength and allows background light of wavelengths other than the specific wavelength to pass therethrough. An information source is provided which emits information light having said specific wavelength, so that the background light transmitted through the holographic optical element and the information light reflected by the holographic optical element can be viewed in a same field of view at the same time. The holographic optical element is provided with diffraction characteristics by which a wavelength corresponding to a complementary color of the specific wavelength is reflected, in addition to the specific wavelength.

According to another aspect of the present invention, there is provided a heads-up display with a holographic optical element which reflects only a specific wavelength and allows background light other than the specific wave length to pass therethrough. An information source emits information light of the specific wavelength. An additional optical element is provided which does not allow a wavelength of light corresponding to a complementary color of the specific wavelength to pass therethrough, so that the background light transmitted through the holographic optical element and the information light of the specific wavelength reflected by the holographic optical element can be viewed in a same field of view at the same time.

In the present invention, since the natural light (background light) is incident upon the holographic optical element, only the specific wavelength is reflected or diffracted, so that the light transmitted through the holographic optical element is colored with a complementary color of the specific wavelength. However, according to the present invention, the wavelength of the complementary color is removed by the holographic optical element or the additional optical element, and accordingly, a background light not colored by the complementary color can be viewed by a viewer in the same field of view as the information light.

It is also possible to remove the wavelength of the complementary color before the background light is incident upon the holographic optical elements.

BRIEF DESCRIPTION OF THE DRAWINGS

The invention will be described below in detail with reference to the accompanying drawings, in which.

DESCRIPTION OF THE PREFERRED EMBODIMENTS

Figure 23:
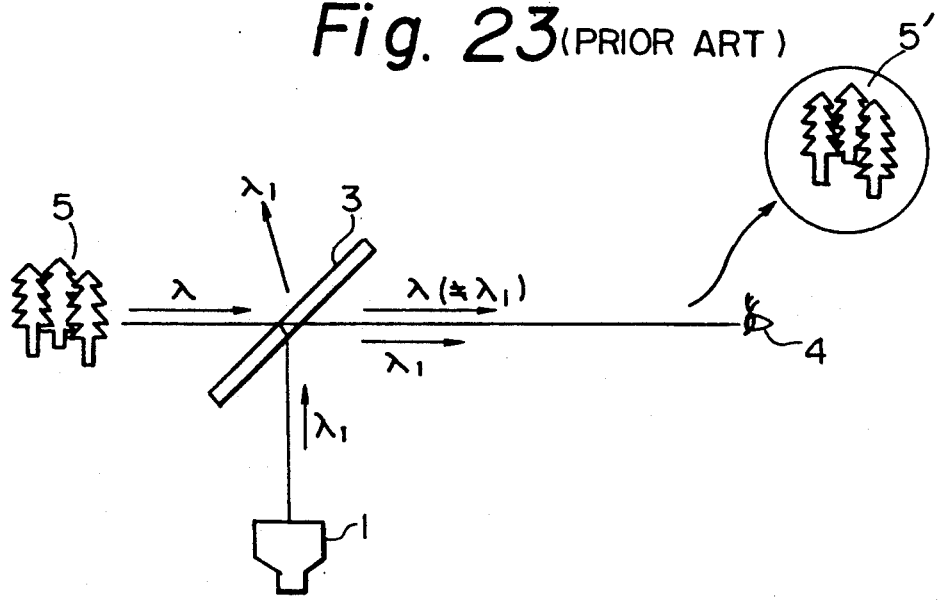
FIG. 23 is a schematic view of a known heads-up display according to a prior art; and, FIG. 24 is a diagram showing wavelength characteristics of a holographic optical element of a known HUD shown in FIG. 23.
Figure 24:
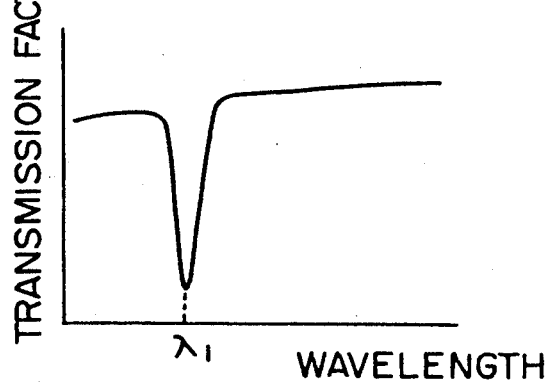

For a better understanding of the present invention, the following discussion will be first directed to the prior art shown in FIGS. 23 and 24.

In FIG. 23, information indicated at an information source (e.g., CRT) 1 is represented by a wavelength $\lambda 1$ and is incident upon a holographic optical element (hologram plate) 3 having wavelength characteristics, as shown in FIG. 24, in which only light of a specific wavelength $\lambda 1$ is reflected (or diffracted) by the holographic optical element 3. The information light of the wavelength $\lambda 1$ emitted from the CRT 1 and made incident upon the holographic optical element 3 is reflected by the holographic optical element 3 in a predetermined direction toward the viewer's eyes 4, so that the viewer can observe the information light $\lambda 1$. On the other hand, since light other than the wavelength $\lambda 1$ is transmitted through the holographic optical element 3, background light having all wavelengths $\lambda$ passes through the holographic optical element 3, except for the specific wavelength $\lambda 1$. Namely, the wavelengths $\lambda$ other than the specific wavelength $\lambda 1$ (i.e., $\lambda \neq \lambda 1$) are viewed by a viewer, and the specific wavelength $\lambda 1$ included in the wavelengths $\lambda$ is reflected by the holographic optical element 3 in the direction opposite to the CRT1. Accordingly, the viewer can see both the information light and the background light on which the information light is superimposed, in the same field of view at the same time without moving the eyes 4.

Nevertheless, since the background light viewed by the viewer through the holographic optical element 3 does not include the specific wavelength $\lambda 1$, the background light tends to be colored by a complementary color of the specific wavelength $\lambda 1$, as mentioned before. For example, if $\lambda 1$ is around 510 nm (green), the background is unnaturally colored pink. Namely, the real background image 5 is viewed as an unnaturally colored background image 5'.

Figure 1:
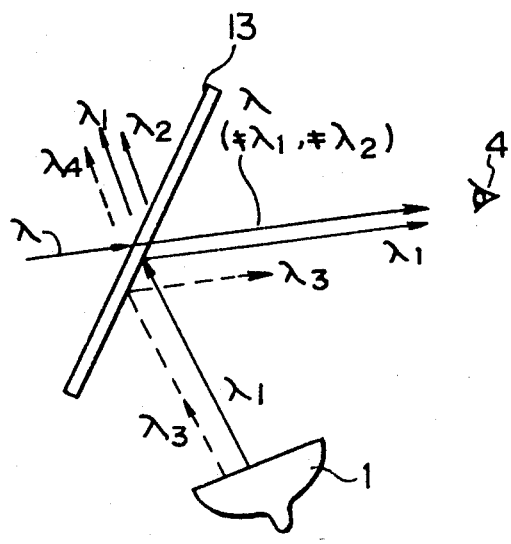
FIG. 1 is a schematic view of a heads-up display according to an aspect of the present invention.

FIG. 1 shows a basic arrangement of a HUD of the present invention in which the elements corresponding to those in FIG. 23 are designated by the same reference numerals.

Figure 2:
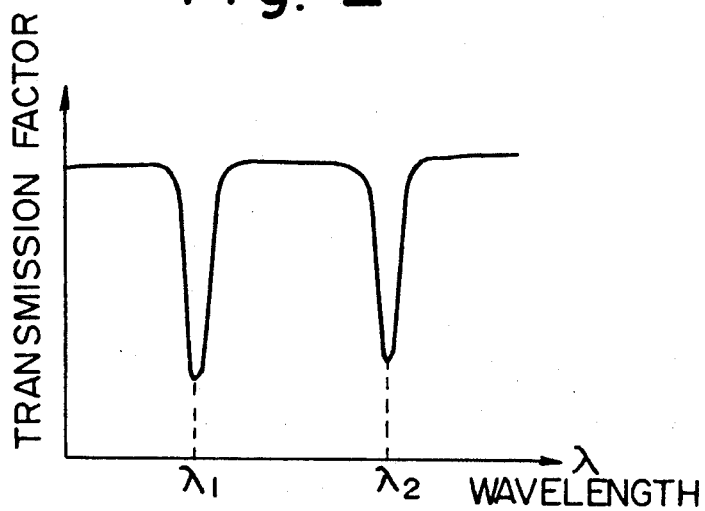
FIG. 2 is a diagram showing wavelength characteristics of a holographic optical element of a HUD shown in FIG. 1.

As mentioned above, among the wavelengths $\lambda$ of the natural light (background light), only the wavelength $\lambda 1$ is reflected by the holographic optical element and the remaining wavelengths are transmitted therethrough, so that the transmitted light is colored with a complementary color (wavelength $\lambda 2$) of the specific wavelength $\lambda 1$. To solve this problem, in the present invention, the holographic optical element 13 has wavelength characteristics such that two wavelengths $\lambda 1$ and $\lambda 2$ of light, which are complementary to each other, are reflected or diffracted thereby and the remaining wavelengths of light are transmitted therethrough, as shown in FIG. 2. For example, if $\lambda 1$ is about 490 nm, $\lambda 2$ is about 600 nm.

Therefore, the background light transmitted through the holographic optical element 13 excludes only the two wavelengths $\lambda 1$ and $\lambda 2$ complementary to each other. Accordingly, the above-mentioned tendency unnaturally colored background light is eliminated.

Furthermore, since the two specific wavelengths are reflected or diffracted by the holographic optical element 13, it is possible to either one or both of the two colors corresponding to the specific wavelengths for the information light emitted from the CRT 1. Namely, a choice of more than our color to display the necessary information can be made. Thus, a multi-color display can be realized.

The basic idea of the present invention can be extended to more than two specific wavelengths ($\lambda 1$ and $\lambda 2$) that are complementary to each other. Namely, it is possible to provide a holographic optical element which reflects or diffracts any number of specific wavelengths $\lambda 1$, $\lambda 2$, $\lambda 3$, $\lambda 4$, etc., to use more than two colors for the information light, as shown by an imaginary line in FIG. 1. Namely, if two wavelengths $\lambda 1$ and $\lambda 3$ are used for the information light, the holographic optical element 13 has transmission characteristics (diffraction characteristics) such that the wavelengths $\lambda 1$ and $\lambda 3$ as well as the wavelengths $\lambda 2$ and $\lambda 4$, which are respectively complementary to the wavelengths $\lambda 1$ and $\lambda 3$, are reflected or diffracted by the holographic optical element 13.

As is well known, the holographic optical element 13 which reflects or diffracts the specific wavelengths can be made of a hologram plate having the diffraction characteristics as shown in FIG. 2. The hologram plate can be realized by a multiple interference exposure wherein a first hologram which reflects or diffracts only the specific wavelength $\lambda 1$ is first formed (exposed) and then a second hologram which reflects or diffracts only the specific wavelength $\lambda 2$ is formed and superimposed on the first hologram. Alternatively, it is also possible to make the holographic optical element 13 of two separate hologram plates corresponding to the first and second holograms mentioned above, and superimpose one on the other.

Note, the "wavelength" referred to above and hereinafter covers a certain band of wavelength.

Figure 3:
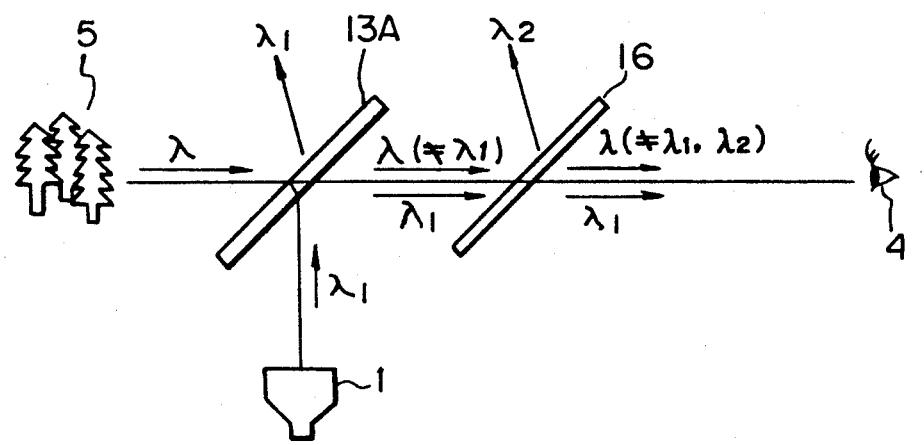
FIG. 3 is a schematic view of a heads-up display according to another aspect of the present invention.

FIG. 3 shows a different embodiment of the present invention, in which a holographic optical element 13A and a separate optical element 16 are provided in a light path. The holographic optical element 13A corresponds to the holographic optical element 3 shown in FIG. 23. Namely, the holographic optical element 13A has diffraction characteristics, as shown in FIG. 24, such that only the wavelength $\lambda 1$ is reflected or diffracted by the holographic optical element 13A, and the other wavelengths are transmitted therethrough. The improvement of the invention in this embodiment is directed to the provision of the additional optical element 16. The optical element 16 absorbs or reflects the wavelength λ2, which is a complementary color of the wavelength λ1, and allows the wavelengths other than λ2 to pass therethrough. In this embodiment, although the light transmitted through the holographic optical element 13A is colored by a complementary color (i.e., wavelength λ2) of the wavelength λ1, as mentioned above, the wavelength λ2 is removed by the optical element 16 provided between the viewer 4 and the holographic optical element 13A.

The optical element 16 is made of a hologram plate which reflects or diffracts only the specific wavelength (e.g., λ2), similar to the holographic optical element 13A, or a wavelength filter which absorbs only the specific wavelength (e.g., λ2).

Figure 4:
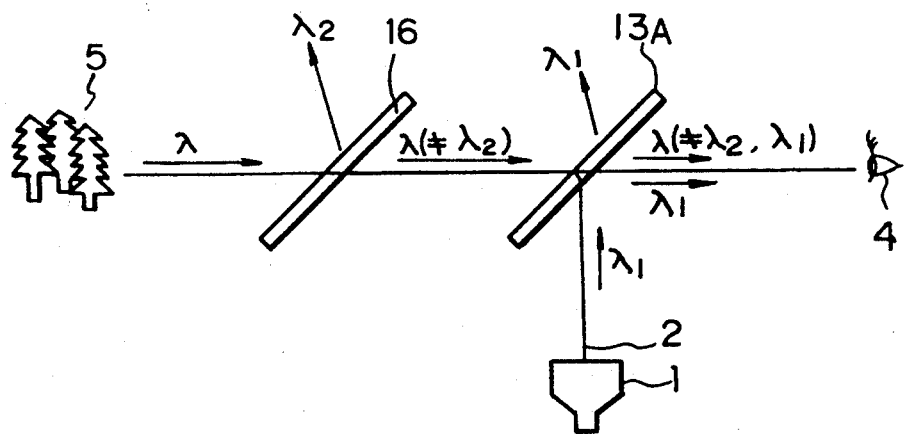
FIG. 4 is a schematic view of a heads-up display according to still another aspect of the present invention.

FIG. 4 shows a modified embodiment of FIG. 3. In FIG. 4, the order of the arrangement of the holographic optical element 13A and the additional optical element 16 is opposite to that of FIG. 3. Namely, in FIG. 4, the additional optical element 16 is located in front of the holographic optical element 13A, and farther from the viewer.

Figure 5:
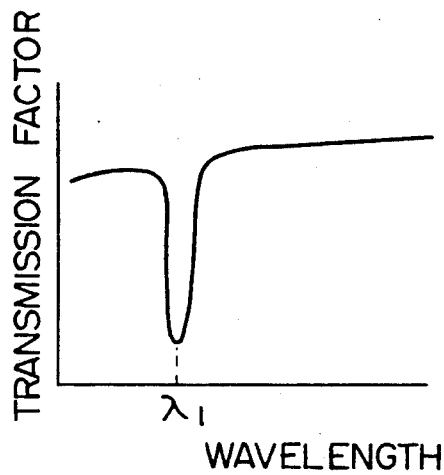
FIGS. 5 and 6 are diagrams showing wavelength characteristics of two holographic optical elements of a HUD shown in FIG. 4.
Figure 6:
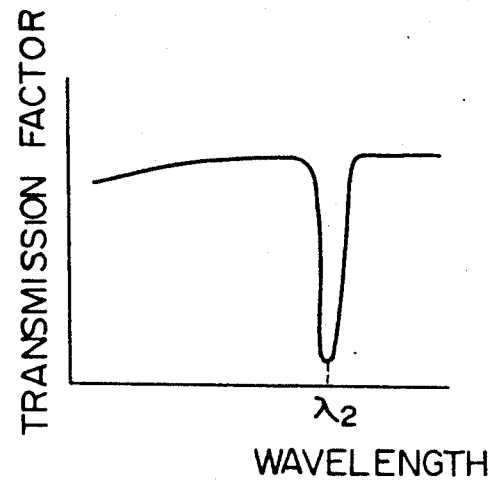

In the embodiment shown in FIG. 4, the complementary color (i.e., wavelength λ2) of the wavelength λ1 is first removed by the optical element 16 and then the wavelength λ1 is removed by the holographic optical element 13A. In the illustrated embodiment, the holographic optical element 13A has diffraction characteristics, as shown in FIG. 5, such that only the wavelength λ1 (e.g., λ1=490 nm, green) is reflected or diffracted. Similarly, the optical element 16 has reflection (transmission) characteristics as shown in FIG. 6, such that only the wavelength λ2 (e.g., λ2=600 nm, red) is reflected.

The information light 2 (wavelength λ1) emitted from the CRT 1 is reflected (diffracted) by the holographic optical element 13A in the predetermined direction toward the viewer's eyes 4, and as a result, the viewer can see both the information light of the specific wavelength λ1 and the background light which does not include the specific wavelengths λ1 or λ2 (a complementary color of wavelength λ1, in the same field of view at the same time substantially without moving the eyes. Unlike the prior art, the background is not colored by the complementary color of the information light.

The optical element 16 is not limited to an optical element which reflects the specific wavelength, and can be an optical element which absorbs or damps the specific wavelength.

Figure 7:
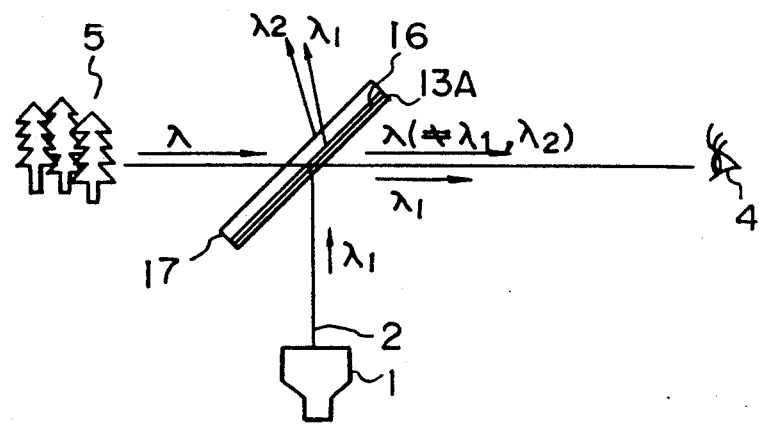
FIG. 7 is a schematic view of a heads-up display according to another aspect of the present invention.

FIG. 7 shows another embodiment of the present invention, in which the optical element 16 is integrally formed on a transparent substrate 17 of the holographic optical element 13A. Namely, since the holographic optical element 13A is made of a hologram formed on the transparent substrate 17, the latter is commonly used for the optical element 16. This embodiment makes the heads-up display smaller and simpler.

Figure 8:
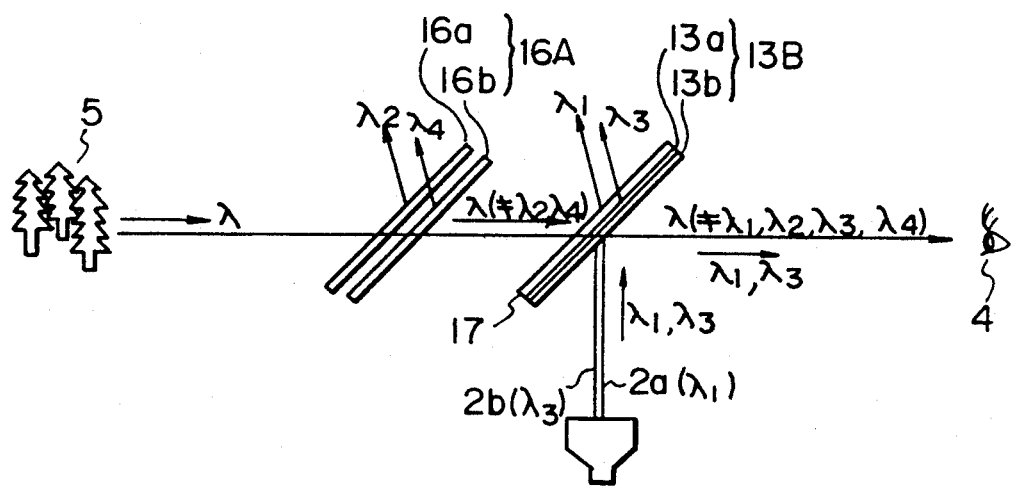
FIG. 8 is a schematic view of a heads-up display according to another aspect of the present invention.

FIG. 8 shows still another embodiment of the present invention, in which a plurality of wavelengths λ1 and λ3 (i.e., colors) of the information lights 2a and 2b are emitted from the indicator (CRT, etc.) 1. The holographic optical element 13B has two holograms 13a and 13b formed on a common transparent substrate 17 by a multiple interference exposure. Instead of the single holographic optical element 13B, it is possible to use two holographic optical elements superimposed one on the other, and each having a hologram formed on a transparent substrate.

Figure 9:
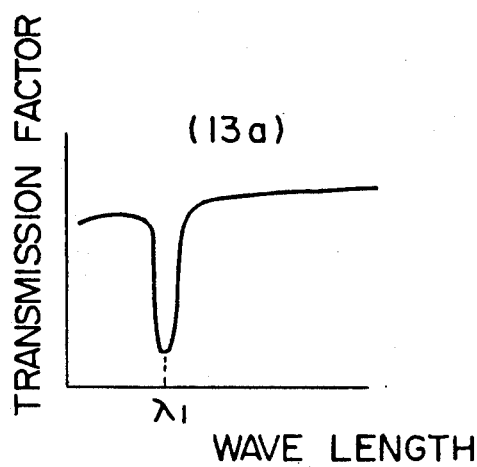
FIGS. 9 and 10 are diagrams showing wavelength characteristics of two holographic optical elements of a holographic optical element unit shown in FIG. 8.
Figure 10:
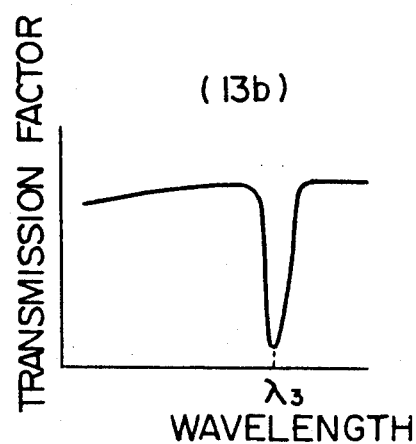

The first hologram 13a has diffraction characteristics such that only the wavelength λ1 (e.g., 490 nm) is reflected (or diffracted), and the other wavelengths are transmitted therethrough, as shown in FIG. 9. The second hologram 13b has diffraction characteristics such that only the wavelength λ3 (e.g., 570 nm) is reflected (or diffracted), and the other wavelengths are transmitted therethrough, as shown in FIG. 10.

Figure 11:
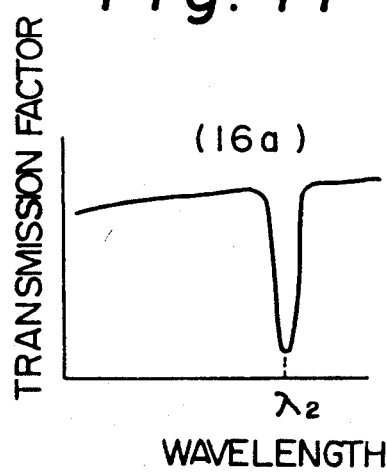
FIGS. 11 and 12 are diagrams showing wavelength characteristics of two holographic optical elements of another holographic optical element unit shown in FIG. 8.
Figure 12:
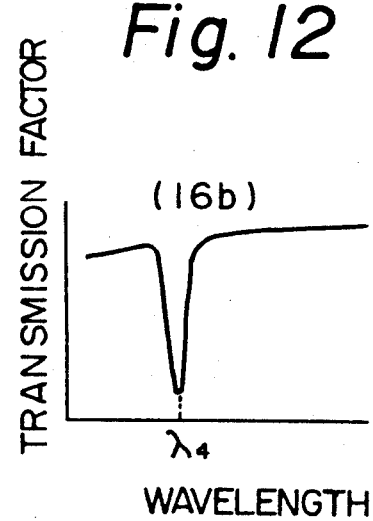

On the other hand, the optical element unit 16A has two optical elements 16a and 16b, each corresponding to the optical element 16 shown in FIG. 4. The first optical element 16a has transmission characteristics such that only the wavelength λ2, which is a complementary color of the wavelength λ1, is reflected (or absorbed), and the other wavelengths are transmitted therethrough, as shown in FIG. 11. Similarly, the second optical element 16b has transmission characteristics such that only the wavelength λ4, which is a complementary color of the wavelength λ3, is reflected (or absorbed), and the other wavelengths are transmitted therethrough, as shown in FIG. 12. Thus, the background light transmitted through the optical element 16A does not include the wavelengths λ2 and λ4, and the background light transmitted through the holographic optical element 13B does not include the wavelengths λ1 and λ3, in addition to the wavelengths λ2 and λ4. Namely, the background light is not colored by the complementary colors (wavelengths λ2 and λ4) of the wavelengths λ1 and λ3.

Figure 13:
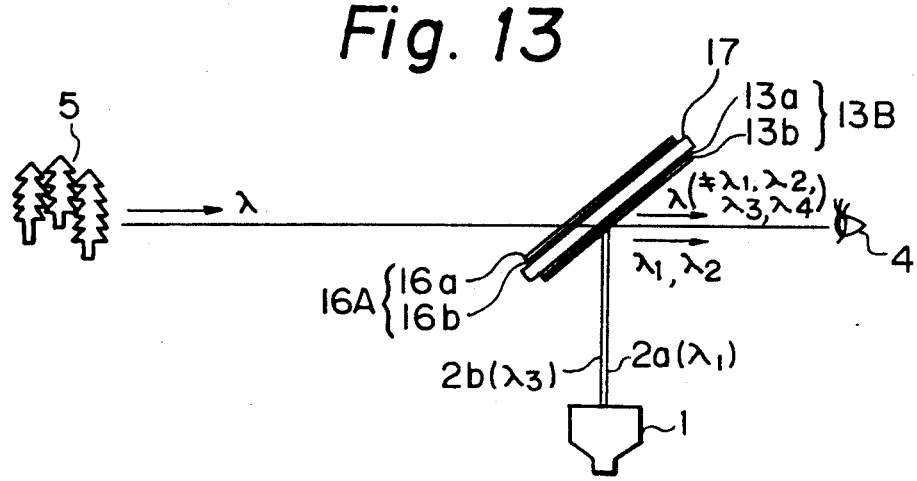
FIG. 13 is a schematic view of a heads-up display according to another aspect of the present invention.

FIG. 13 shows a modified embodiment of FIG. 8 and corresponds to the embodiment shown in FIG. 7. Namely, in FIG. 13, the first and second holograms 13a and 13b ant the first and second optical elements 16a and 16b are all formed on opposite side faces of a same transparent substrate 17, for a simplification and minimization of the device similar to the embodiment illustrated in FIG. 7.

It should be easily understood that the embodiments shown in FIGS. 8 and 13 can be applied to more than two information lights 2a and 2b. Namely, a multi-color display having more than two colors can be easily realized by increasing the number of the holographic optical elements 13a, 13b, etc., and the optical elements 16a, 16b, etc.

Figure 14:
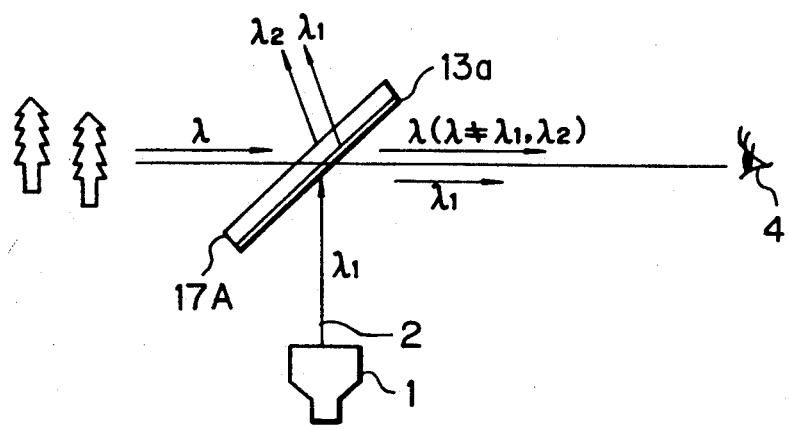
FIG. 14 is a schematic view of a heads-up display according to another aspect of the present invention.
Figure 15:
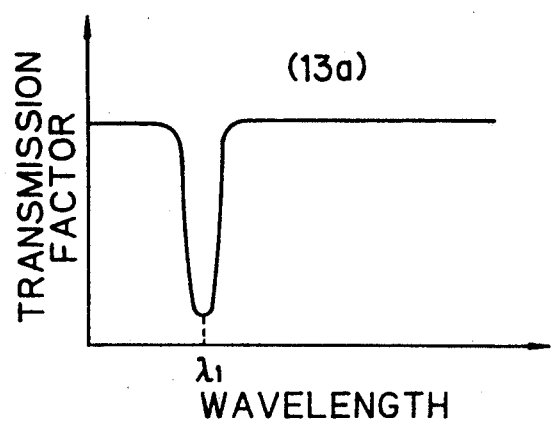
FIGS. 15 and 16 are diagrams showing wavelength characteristics of two holographic optical elements of a HUD shown in FIG. 14.
Figure 16:
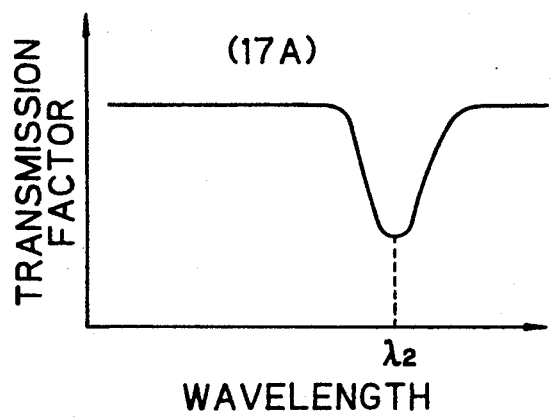

FIG. 14 through 16 show another embodiment of the present invention, in which the holographic optical element unit has a hologram 13a which diffracts the wavelength λ1 (FIG. 15) and a substrate (e.g. colored glass) 17A which does not permit light of wavelength λ2, which is complementary to the wavelength λ1, to pass therethrough (FIG. 16). The substrate 17A can be a diffuser which diffuses light or a filter which absorbs light of the specific wavelength λ2. The hologram 13a can be formed on the substrate 17A which serves as a hologram substrate.

Figure 17:
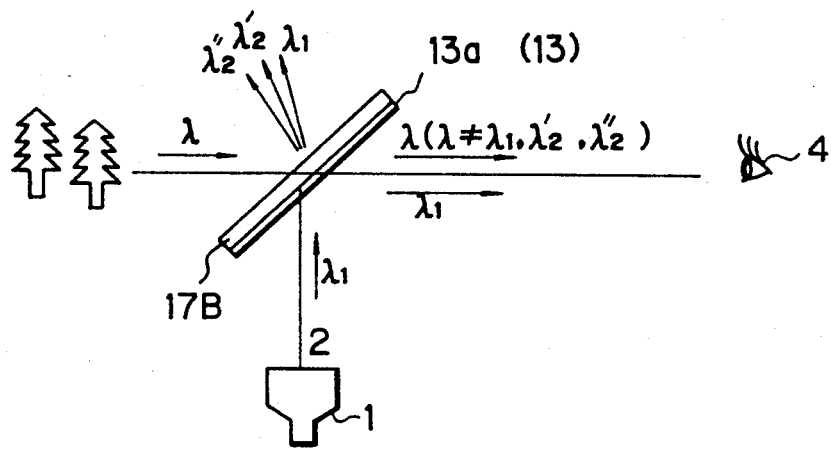
FIG. 17 is a schematic view of a heads-up display according to another aspect of the present invention.
Figure 18:
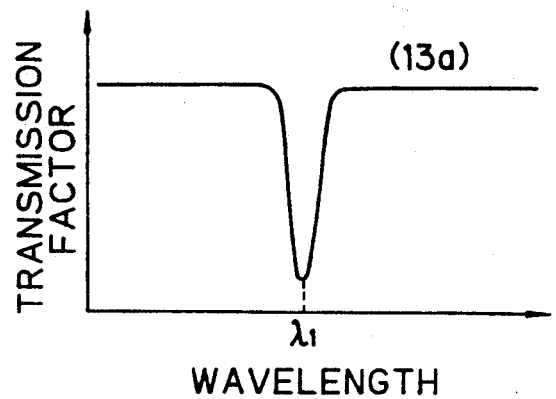
FIGS. 18 and 19 are diagrams showing wavelength characteristics of two holographic optical elements of a holographic optical element unit shown in FIG. 17.
Figure 19:
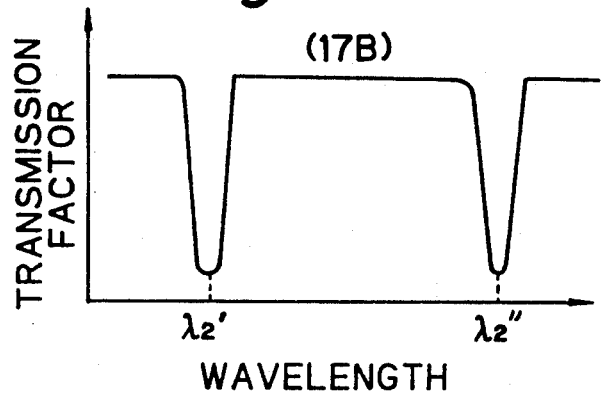

FIG. 17 through 19 show another embodiment of the present invention. As is well known, a case occurs in which no single wavelength λ2 complementary to the wavelength λ1, which is diffracted, for example, by the holographic optical element 13 (FIG. 1) or the hologram 13a (FIG. 14), exists. For example, if λ1 is about 493 nm–570 nm, there is no single wavelength λ2 complementary thereto. In this case, the wavelength λ2 is defined, for example, by a combination of two wavelengths λ2' and λ2". For example, when λ1 is 510 nm (λ1=510 nm), λ2' and λ2" are 460 nm and 630 nm, respectively (λ2'=460 nm, λ2"=630 nm). The optical means for removing the wavelengths λ2' and λ2" can be constituted by a holographic optical element 17B having two multi-exposed holograms which reflect or diffract the wavelengths λ2' and λ2", respectively, or two independent holographic optical elements which reflect or diffract the wavelengths λ2' and λ2", respectively, or a non-holographic optical element (or elements) which absorbs or reflects the wavelengths λ2' and λ2".

Figure 20:
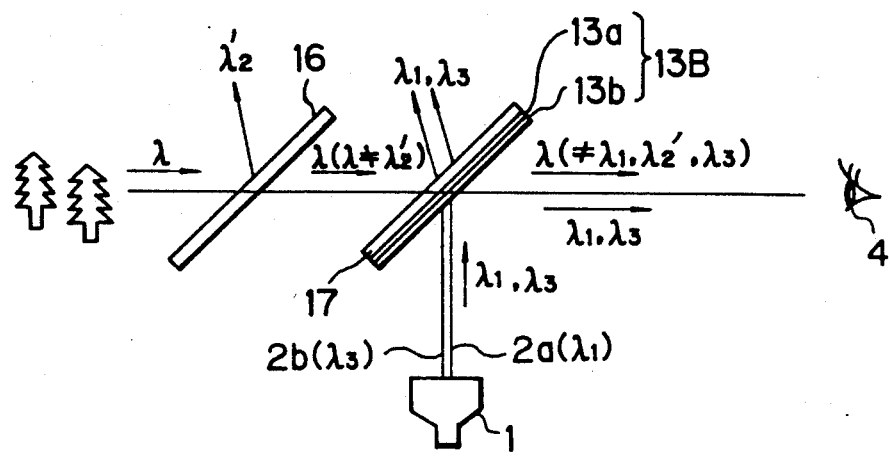
FIG. 20 a schematic view of a heads-up display according to another aspect of the present invention.
Figure 21:
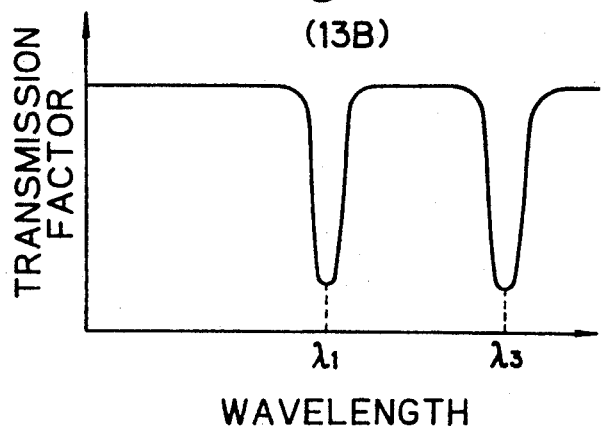
FIGS. 21 and 22 are diagrams showing wavelength characteristics of two holographic optical elements of a holographic optical element unit shown in FIG. 20.
Figure 22:
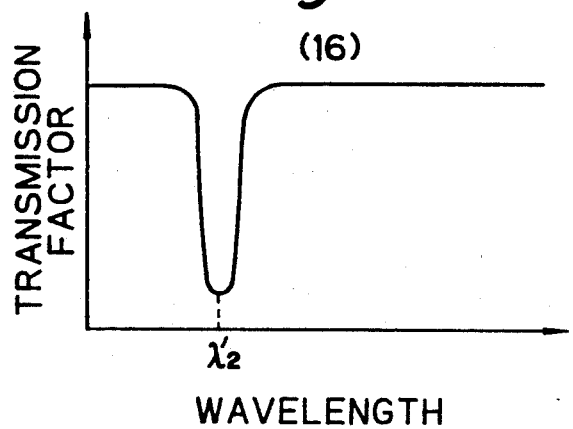

FIG. 20 through 22 show still another embodiment of the present invention, which is a modification of the embodiment of FIG. 8. In this embodiment, a plurality of wavelengths λ1 and λ3 of the information lights 2a and 2b are emitted from the indicator (CRT, etc.) 1. The holographic optical element 13B has two holograms 13a and 13b formed on the common transparent substrate 17; the first hologram 13a reflects or diffracts the wavelength λ1 and permits the other wavelengths to pass therethrough, and the second hologram 13b reflects or diffracts the wavelength λ3 and permits the other wavelengths to pass therethrough.

If a single wavelength complementary to the wavelengths λ1 and λ3 exists, i.e., if a color complementary to the composite color of the wavelengths λ1 and λ3 is defined by a wavelength λ2', the optical element 16 removes the wavelength λ2'. The optical element 16 can be made of a hologram which reflects (or diffracts) the wavelength λ2' and permits the other wavelengths to pass therethrough, or a non-holographic optical element, such as a filter which absorbs only the wavelength λ2' can be used.

In the embodiment illustrated in FIGS. 20 through 22, for example, λ1=540 nm, λ3=600 nm, λ2'=440 nm.

We claim:

1. A heads-up display, comprising:
a holographic optical element located along a field of view and having diffraction characteristics sufficient to reflect a predetermined first wavelength, to reflect a second wavelength corresponding to a substantially complementary color of the predetermined first wavelength and to pass therethrough wavelengths of a background light other than the first and second wavelengths; and
an information source which emits an information light having the predetermined first wavelength and configured so that the background light transmitted through said holographic optical element and the information light reflected by the holographic optical element can be simultaneously viewed along the field of view.

2. A heads-up display according to claim 1, wherein said holographic optical element is a hologram plate having the diffraction characteristics such that said holographic optical element reflects the predetermined first wavelength and the second wavelength corresponding to a substantially complementary color of the predetermined first wavelength.

3. A heads-up display, comprising:
a holographic optical element located along a field of view and having diffraction characteristics sufficient to reflect a predetermined first wavelength and pass a background light of wavelengths other than the predetermined first wavelength therethrough;
an information source which emits an information light of the predetermined first wavelength and configured to direct the information light onto a surface of said holographic optical element; and
an additional optical element located along the field of view and having characteristics sufficient to not pass therethrough a second wavelength of light corresponding to a substantially complementary color of the predetermined first wavelength so that the background light transmitted through said holographic optical element and the information light of the predetermined first wavelength reflected by the holographic optical element can be simultaneously viewed along the field of view.

4. A heads-up display according to claim 3, wherein said additional optical element does not pass the second wavelength by reflecting the second wavelength which corresponds to the substantially complementary color of the predetermined first wavelength.

5. A heads-up display according to claim 3, wherein said additional optical element does not pass the second wavelength by absorbing the second wavelength which corresponds to the substantially complementary color of the predetermined first wavelength.

6. A heads-up display according to claim 3, wherein said additional optical element is located along the field of view between the holographic optical element and a source of the background light.

7. A heads-up display according to claim 3,
wherein said holographic optical element comprises a hologram which reflects only the predetermined first wavelength and passes wavelengths other than the predetermined first wavelength, and
wherein said additional optical element comprises a substrate on which the hologram of the holographic optical element is formed and which removes the second wavelength which corresponds to the substantially complementary color of the predetermined first wavelength and passes wavelengths other than the second wavelength.

8. A heads-up display according to claim 7, wherein said substrate reflects the second wavelength.

9. A heads-up display according to claim 3, wherein the second wavelength is a combination of two wavelengths which are removed by said additional optical element.

10. A heads-up display comprising:
a holographic optical element located along a field of view and having diffraction characteristics sufficient to reflect a predetermined first wavelength and pass a background light of wavelengths other than the predetermined first wavelength therethrough;
an information source which emits an information light of the predetermined first wavelength and configured to direct the information light onto a surface of said holographic optical element; and
an additional optical element located along the field of view and having characteristics sufficient to not pass therethrough a second wavelength of light corresponding to a substantially complementary color of the predetermined first wavelength so that the background light transmitted through said holographic optical element and the information light of the predetermined first wavelength reflected by the holographic optical element can be simultaneously viewed along the field of view; and
wherein both said holographic optical element and said additional optical element are formed on a common transparent substrate.

11. A heads-up display comprising:
a holographic optical element located along a field of view and having diffraction characteristics sufficient to reflect a predetermined first wavelength and pass a background light of wavelengths other than the predetermined first wavelength therethrough;
an information source which emits an information light of the predetermined first wavelength and configured to direct the information light onto a surface of said holographic optical element; and
an additional optical element located along the field of view and having characteristics sufficient to not pass therethrough a second wavelength of light corresponding to a substantially complementary color of the predetermined first wavelength so that the background light transmitted through said holographic optical element and the information light of the predetermined first wavelength reflected by the holographic optical element can be simultaneously viewed along the field of view; and
wherein said additional optical element is located along the field of view between the holographic optical element and a viewer.

12. A heads-up display comprising:
a holographic optical element located along a field of view and having diffraction characteristics sufficient to reflect a predetermined first wavelength and pass a background light of wavelengths other than the predetermined first wavelength therethrough;
an information source which emits an information light of the predetermined first wavelength and configured to direct the information light onto a surface of said holographic optical element; and
an additional optical element located along the field of view and having characteristics sufficient to not pass therethrough a second wavelength of light corresponding to a substantially complementary color of the predetermined first wavelength so that the background light transmitted through said holographic optical element and the information light of the predetermined first wavelength reflected by the holographic optical element can be simultaneously viewed along the field of view; and
wherein said holographic optical element comprises a hologram which reflects only the predetermined first wavelength and passes wavelengths other than the predetermined first wavelength;
wherein said additional optical element comprises a substrate on which the hologram of the holographic optical element is formed and which removes the second wavelength which corresponds to the substantially complementary color of the predetermined first wavelength and passes wavelengths other than the second wavelength; and
wherein said substrate absorbs the second wavelength.

13. A heads-up display, comprising:
a holographic optical element located along a field of view and having diffraction characteristics sufficient to reflect a first set of predetermined wavelengths and to reflect a second set of wavelengths each corresponding to a substantially complementary color of a corresponding one of the predetermined wavelengths of the first set and to pass a remaining part of a background light therethrough; and
an information source which emits information lights corresponding to the first set of the predetermined wavelengths and configured so that the background light transmitted through said holographic optical element and the information lights reflected by said holographic optical element can be simultaneously viewed along the field of view.

14. A heads-up display, comprising:
a holographic optical element located along a field of view and having diffraction characteristics sufficient to reflect a first set of predetermined wavelengths and to pass a remaining part of a background light therethrough;
an information source which emits information lights corresponding to the first set of the predetermined wavelengths and configured to direct the information lights onto a surface of said holographic optical element; and
an additional optical element located along the field of view and having characteristics sufficient to not pass therethrough a second set of wavelengths each corresponding to a substantially complementary color of a corresponding one of the predetermined wavelengths of the first set so that the background light transmitted through said holographic optical element and the information lights reflected by said holographic optical element can be simultaneously viewed along the field of view.

15. A heads-up display, comprising:
a holographic optical element located along a field of view and having diffraction characteristics sufficient to reflect a first set of predetermined wavelengths and to pass a remaining part of a background light therethrough;
an information source which emits information lights corresponding to the first set of the predetermined wavelengths and configures to direct the information lights onto a surface of said holographic optical element; and
an additional optical element located along the field of view and having characteristics sufficient to not pass therethrough a second set of wavelengths each corresponding to a substantially complementary color of a corresponding one of the predetermined wavelengths of the first set so that the background light transmitted through said holographic optical element and the information lights reflected by said holographic optical element can be simultaneously viewed along the field of view; and
wherein said holographic optical element comprises a plurality of holograms formed on a transparent substrate.

16. A heads-up display, comprising:
a holographic optical element located along a field of view and having diffraction characteristics sufficient to reflect a first set of predetermined wavelengths and to pass a remaining part of a background light therethrough;
an information source which emits information lights corresponding to the first set of the predetermined wavelengths and configured to direct the information lights onto a surface of said holographic optical element; and
an additional optical element located along the field of view and having characteristics sufficient to not pass therethrough a second set of wavelengths each corresponding to a substantially complementary color of a corresponding one of the predetermined wavelengths of the first set so that the background light transmitted through said holographic optical element and the information lights reflected by said holographic optical element can be simultaneously viewed along the field of view; and wherein said holographic optical element comprises a plurality of hologram plates, each hologram plate having a hologram formed on a transparent substrate.

17. A heads-up display, comprising:

a holographic optical element located along a field of view and having diffraction characteristics sufficient to reflect a first set of predetermined wavelengths and to pass a remaining part of a background light therethrough;

an information source which emits information lights corresponding to the first set of the predetermined wavelengths and configured to direct the information lights onto a surface of said holographic optical element; and an additional optical element located along the field of view and having characteristics sufficient to not pass therethrough a second set of wavelengths each corresponding to a substantially complementary color of a corresponding one of the predetermined wavelengths of the first set so that the background light transmitted through said holographic optical element and the information lights reflected by said holographic optical element can be simultaneously viewed along the field of view; and wherein said additional optical element comprises a plurality of optical plates which reflect or absorb the second set of wavelengths.

18. A heads-up display, comprising:

a holographic optical element located along a field of view and having diffraction characteristics sufficient to reflect a first set of predetermined wavelengths and to pass a remaining part of a background light therethrough;

an information source which emits information lights corresponding to the first set of the predetermined wavelengths and configured to direct the information lights onto a surface of said holographic optical element; and an additional optical element located along the field of view and having characteristics sufficient to not pass therethrough a second set of wavelengths each corresponding to a substantially complementary color of a corresponding one of the predetermined wavelengths of the first set so that the background light transmitted through said holographic optical element and the information lights reflected by said holographic optical element can be simultaneously viewed; and wherein both said holographic optical element and said additional optical element are formed on a common transparent substrate.

19. A heads-up display, comprising:

a holographic optical element located along a field of view and having diffraction characteristics sufficient to reflect a first set of predetermined wavelengths and to pass a remaining part of a background light therethrough;

an information source which emits information lights corresponding to the first set of the predetermined wavelengths and configured to direct the information lights onto a surface of said holographic optical element; and an additional optical element located along the field of view and having characteristics sufficient to not pass therethrough a wavelength of light corresponding to a substantially complementary color of the first set of predetermined wavelengths in combination so that the background light transmitted through said holographic optical element and the information lights reflected by said holographic optical element can be simultaneously viewed along the field of view.

* * * * *

UNITED STATES PATENT AND TRADEMARK OFFICE
CERTIFICATE OF CORRECTION

PATENT NO.   : 5,210,624
DATED        : May 11, 1993
INVENTOR(S)  : Matsumoto et al.

It is certified that error appears in the above-indentified patent and that said Letters Patent is hereby corrected as shown below:

Col. 6,   line 37,   change "ant" to --and--;
          line 39,   delete "a".

Col. 12,  line 38,   after "viewed" insert --; and--
          line 39,   insert paragraph indentation; change "along the field of view" to --wherein both said holographic optical element and said additional element are formed on a common transparent substrate.--.

Signed and Sealed this

Twenty-sixth Day of April, 1994

Attest:

BRUCE LEHMAN

Attesting Officer    Commissioner of Patents and Trademarks